(12) United States Patent
Yoshida et al.

(10) Patent No.: US 7,475,749 B2
(45) Date of Patent: Jan. 13, 2009

(54) FUEL TANK SHROUD AND RELATED SUPPORT STRUCTURE FOR A MOTORCYCLE, AND MOTORCYCLE INCORPORATING SAME

(75) Inventors: Naoki Yoshida, Saitama (JP); Eiji Sugiyama, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 346 days.

(21) Appl. No.: 11/349,065

(22) Filed: Feb. 7, 2006

(65) Prior Publication Data

US 2006/0175112 A1 Aug. 10, 2006

(30) Foreign Application Priority Data

Feb. 7, 2005 (JP) .............................. 2005-030588

(51) Int. Cl.
*B62J 23/00* (2006.01)
(52) U.S. Cl. .................... 180/68.1; 180/229; 196/180.1
(58) Field of Classification Search ................. 180/219, 180/229, 68.1; 296/180.1
See application file for complete search history.

(56) References Cited

U.S. PATENT DOCUMENTS 5,715,904 A * 2/1998 Takahashi et al. ........... 180/229
5,984,035 A * 11/1999 Katoh et al. ................ 180/68.1

FOREIGN PATENT DOCUMENTS

| JP | 03-279093 | 12/1991 |
|----|-----------|---------|
| JP | 2582251 | 11/1996 |

\* cited by examiner

*Primary Examiner*—Kevin Hurley
(74) *Attorney, Agent, or Firm*—Carrier, Blackman & Associates, P.C.; William D. Blackman; Joseph P. Carrier (57) ABSTRACT

In a motorcycle, a fuel tank shroud is arranged on each side of the fuel tank so that the shrouds cover at least part of both side surfaces of the fuel tank. The rear portions of the shrouds are stably supported to avoid vibration. Each shroud is formed of synthetic resin and integrally includes a main portion for covering the side of a fuel tank, a supporting arm portion extending inward from a rear portion of the main portion and sandwiched between a front portion of a seat and a rear portion of the fuel tank, and an engaging portion projecting from a distal end of the supporting arm portion. A bottom plate of the seat is integrally provided with a latching portion for allowing removable engagement with the engaging portion of the fuel tank shrouds, whereby the rear portion of the shrouds are supported.

17 Claims, 6 Drawing Sheets

FUEL TANK SHROUD AND RELATED SUPPORT STRUCTURE FOR A MOTORCYCLE, AND MOTORCYCLE INCORPORATING SAME

CROSS-REFERENCE TO RELATED APPLICATIONS

The present invention claims priority under 35 USC 119 based on Japanese patent application No. 2005-030588, filed on Feb. 7, 2005. The subject matter of these priority documents is incorporated by reference herein.

BACKGROUND OF THE INVENTION

1. Field of the Invention

The present invention relates to a motorcycle having a vehicle body frame, and to components of such a motorcycle. The vehicle body frame includes a head pipe which steerably supports a front fork which in turn rotatably supports an axis of a front wheel, an engine for driving a rear wheel, and a fuel tank arranged behind the head pipe and above the engine. The engine and the fuel tank are mounted on the vehicle body frame, a seat is arranged on the rear side of the fuel tank, and a front portion of the seat overlaps a rear portion of the fuel tank to cover the same from above. Shrouds are provided which are arranged on both sides of the fuel tank, so as to cover at least part of the side surfaces of the fuel tank. The front ends of the shrouds extend toward the front fork, and are configured to direct traveling wind toward the engine when the motorcycle is in motion. The present invention relates specifically to an improved supporting structure of a rear portion of the shroud.

2. Description of the Background Art

It is known to provide a motorcycle having fuel tank shrouds arranged to cover part of both sides of a fuel tank, and fastened to a respective side surface of the fuel tank. The shrouds, formed of synthetic resin, direct traveling wind toward an engine. The motorcycle includes a known structure in which a mounting strip is provided at a rear portion of the shroud. The mounting strip is adapted to be engaged with a hook-shaped latching strip projected from a rear portion of the fuel tank. This structure is disclosed, for example, in Japanese Patent No. 2582251. An alternative shroud mounting structure is disclosed in Japanese Patent No. 3044731, in which a projection extending from a rear portion of a fuel tank is adapted to be engaged with a mounting hole provided on a rear portion of a synthetic resin shroud, in order to permit fastening of the shroud to a side surface of the fuel tank.

However, while the shroud is formed of synthetic resin, the fuel tank is formed of metal such as iron, and hence the latching strip or the projection on the side of the fuel tank, formed of metal, is engaged with the rear portion of the shroud, formed of synthetic resin, in both of Japanese Patent No. 2582251 and Japanese Patent No. 3044731 described above. Therefore, there arises a necessity to consider friction between the latching strip or the projection and the shroud in accordance with oscillation of the rear portion of the shroud due to an effect of traveling wind, or rattling due to a gap between the latching strip and the projection on the side of the fuel tank and the rear portion of the shroud. In addition, in the structure in which the latching strip or the projection for supporting the rear portion of the shroud is provided, there is a possibility that the capacity of the fuel tank is obliged to be reduced, in order to secure a space for arranging the latching strip or the projection. Furthermore, a case in which the number of components or the number of steps in a welding process is increased must be taken into consideration.

In view of such circumstances, it is an object of the present invention to provide a supporting structure of a rear portion of a shroud in a motorcycle in which the rear portion of the shroud can be stably supported while avoiding an occurrence of rattling for a long term. In addition, the problem of friction generation and/or rattling at the fuel tank side caused by supporting the rear portion of the shroud thereon is solved.

SUMMARY OF THE INVENTION

In order to achieve the above-described object, a first aspect of the invention is directed to a motorcycle including a vehicle body frame. The vehicle body frame has a head pipe which steerably supports a front fork. The front fork, in turn, rotatably supports an axis of a front wheel. The head pipe also supports an engine for driving a rear wheel, and a fuel tank arranged behind the head pipe and above the engine. The engine and the fuel tank are mounted on the vehicle body frame, a seat is arranged on the rear side of the fuel tank, and a front portion of the seat overlaps a rear portion of the fuel tank, so as to cover the same from above. Shrouds are provided which are arranged on both sides of the fuel tank so as to cover at least part of the side surfaces of the fuel tank. Front end portions of the shrouds extend toward the front fork, and are configured to direct traveling wind toward the engine. The invention is characterized in that each shroud is formed of synthetic resin and integrally includes a main shroud portion for covering the side of the fuel tank and secured at least to the fuel tank. Each shroud includes a supporting arm portion extending inward from a rear portion of the main shroud portion and sandwiched between the front portion of the seat and the rear portion of the fuel tank. Each shroud also includes an engaging portion projecting from the distal end of the supporting arm portion. A bottom plate of the seat, which bottom plate may also be formed of synthetic resin, is integrally provided with a latching portion for allowing removable engagement with the engaging portion of the shrouds.

A second aspect of the invention, in addition to the structure of the first aspect of the invention, is characterized in that the engaging portion is formed into a plate shape elongated in the fore-and-aft direction of the motorcycle and extending upward from the supporting arm portion in a protruding manner.

A third aspect of the invention, in addition to the structure of the second aspect of the invention, is characterized in that a latching portion and a guide projection are integrally formed on the lower surface of the bottom plate in a protruding manner. The latching portion permits engagement with the engaging portion between a laterally outward facing surface of the engaging portion and a laterally inward facing surface of the latching portion. Herein, the term "lateral" refers to a left or right side of the motorcycle relative to a forward driving direction of the motorcycle. The latching portion extends in the fore-and-aft direction of the motorcycle. The guide projection is formed extending from the front end of the latching portion, and gradually changes direction toward the outside as it proceeds toward the front. This shape permits the guide projection to guide the engaging portion toward the latching portion.

A fourth aspect of the invention, in addition to the structure in the invention according to any one of first through third aspects of the invention, is characterized in that a front portion of the bottom plate of the seat is disengageably engaged with the upper surface of the rear portion of the fuel tank between the respective engaging portions of the pair of opposed shrouds.

According to the first aspect of the invention, the supporting arm portion provided on the rear portion of the shroud is sandwiched between the rear portion of the fuel tank and the bottom plate of the seat, the engaging portion provided at the distal end of the supporting arm portion is disengageably engaged with the latching portion provided on the bottom plate, and the engaging portion and the latching portion are both formed of synthetic resin. As a result, even when the rear portion of the shroud oscillates due to the effect of traveling wind, friction can be reduced both on the engaging portion and the latching portion, whereby occurrence of rattling is avoided for a long term and stable support of the rear portion of the shroud is enabled. In addition, it is not necessary to provide a structure for supporting the rear portion of the shroud on the side of the fuel tank. Therefore, the number of components and the number of steps in the welding process is reduced, and sufficient capacity of the fuel tank is secured.

According to the second aspect of the invention, since the engaging portion is formed into a plate shape elongated in the fore-and-aft direction of the motorcycle, the oscillation of the rear portion of the shroud in the lateral direction of the motorcycle can be effectively reduced.

According to a third aspect of the invention, since engagement and disengagement of the engaging portion, disposed on the side of the shroud, with respect to the latching portion, disposed on the bottom plate of the seat, is guided by the guiding projection, the efficiency of the mounting and dismounting of the shrouds on the vehicle can be improved.

According to a fourth aspect of the invention, since engagement of the pair of left and right shrouds with the seat is enabled, and the front portion of the seat, which overlaps the rear portion of the fuel tank, is engaged with the upper surface of the rear portion of the fuel tank between both engaging portions, the space between the engaging portions is effectively used.

Modes for carrying out the present invention are explained below by reference to an embodiment of the present invention shown in the attached drawings. The above-mentioned object, other objects, characteristics and advantages of the present invention will become apparent form the detailed description of the embodiment of the invention presented below in conjunction with the attached drawings.

DETAILED DESCRIPTION

A selected illustrative embodiment of the invention will now be described in some detail, with reference to the attached drawings. It should be understood that only structures considered necessary for clarifying the present invention are described herein. Other conventional structures, and those of ancillary and auxiliary components of the system, are assumed to be known and understood by those skilled in the art.

Figure 1:
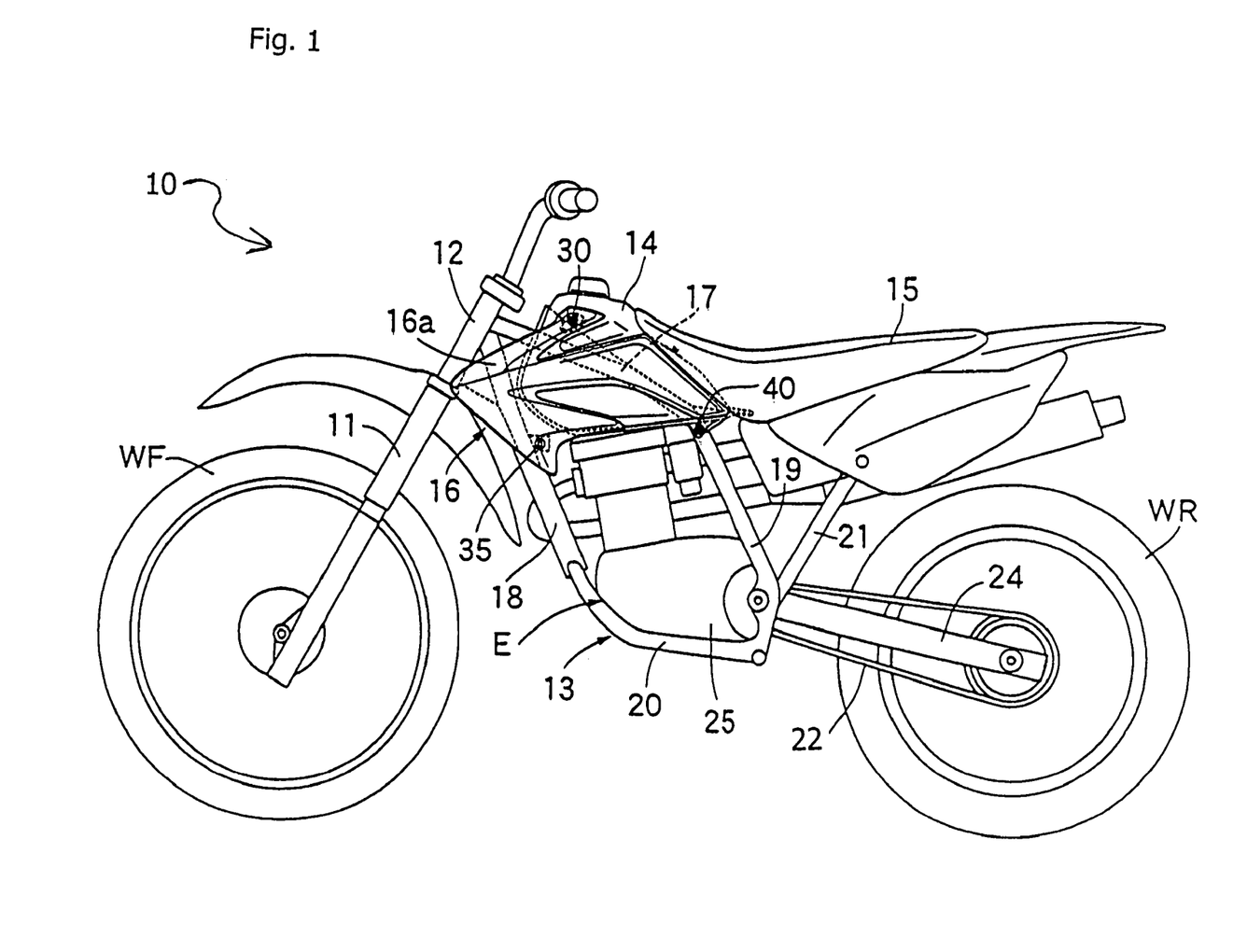
FIG. 1 is a side plan view of a motorcycle showing a left side shroud mounted along a left side of the fuel tank.
Figure 2:
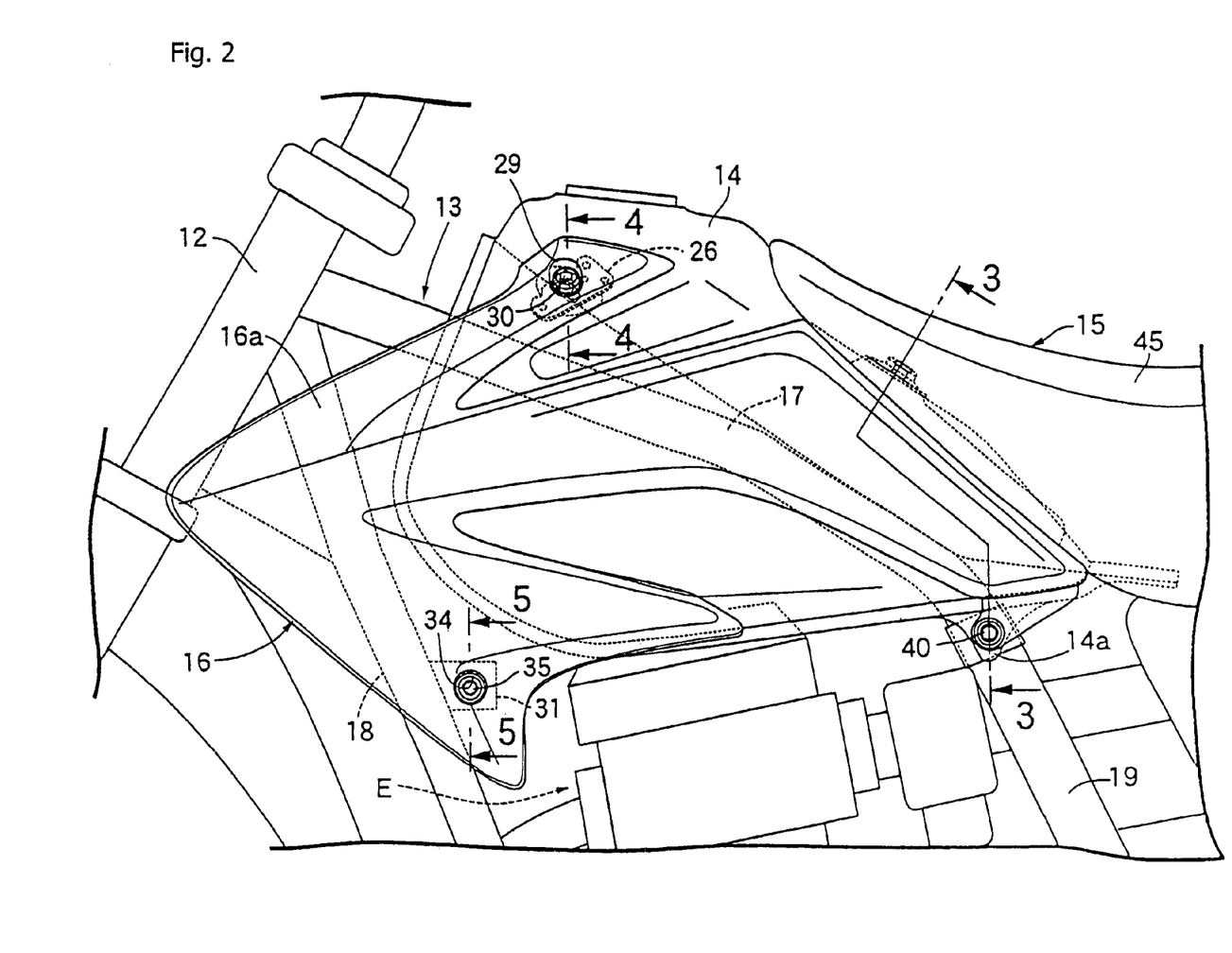
FIG. 2 is an enlarged detail plan view of an upper front portion of the motorcycle of FIG. 1, showing mounting structures used to mount the shroud to the vehicle.

FIG. 1 to FIG. 7 show an example of a motorcycle 10 incorporating a pair of opposed fuel tank shrouds and a related support structure according to a selected illustrative embodiment of the present invention. Referring first to FIGS. 1 and 2, the motorcycle 10 includes a vehicle body frame 13 with front and rear wheels WF, WR rotatably mounted thereon. An engine E for driving the rear wheel WR and a fuel tank 14 are mounted on the vehicle body frame 13. The fuel tank 14 may be formed of a metal, such as for example, iron. The vehicle body frame 13 includes a head pipe 12 at a front end thereof for steerably supporting a front fork 11. The front fork, in turn, rotatably supports an axis of the front wheel WF thereon. The fuel tank 14 is disposed behind the head pipe 12 so as to cover the engine E from above. A front portion of a seat 15 is disposed on the rear side of the fuel tank 14, and overlaps a rear portion of the fuel tank 14 to cover it from above.

A pair of left and right fuel tank shrouds 16 are provided, which are formed of a synthetic resin. The shrouds 16 are attached to the motorcycle 10 in a manner described subsequently herein. The front ends of the shrouds 16 extend toward the front fork 11 to direct traveling wind toward the engine E. The shrouds 16 are arranged on both sides of the fuel tank 14 so as to cover at least part of both side surfaces of the fuel tank 14.

The vehicle body frame 13 includes the head pipe 12 at the front end thereof, and a single main tube 17 extending rearwardly and downwardly from the head pipe 12. The vehicle body frame 13 also includes a pair of left and right down tubes 18 extending rearwardly and downwardly from the head pipe 12 at a sharper angle than the main tube 17, and a pair of left and right center tubes 19 extending downwardly from a rear end of the main tube 17. The vehicle body frame 13 also includes a pair of left and right lower tubes 20 for connecting the lower ends of the both down tubes 18 and the lower ends of the both center tubes 19, a seat rail (not shown) extending from a rear portion of the main tube 17 toward the rear for supporting the seat 15, and rear frames 21 for connecting the lower portions of the center tubes 19 and the seat rail.

Therefore, it will be understood that the fuel tank 14 is arranged extending across the main tube 17, and the engine E is arranged in a space surrounded by the main tube 17, the down tubes 18, the center tubes 19 and the lower tubes 20. A front end of a swing arm 24 is swingably supported at the lower portions of the center tubes 19. The swing arm 24 is provided for swingably supporting the axis of the rear wheel WR. An output drive torque of the engine E is changed in speed by a transmission (not shown) integrated in a crankcase 25 of the engine E, and is then transmitted to the rear wheel WR via a chain-type torque transmitting mechanism 22.

Figure 3:
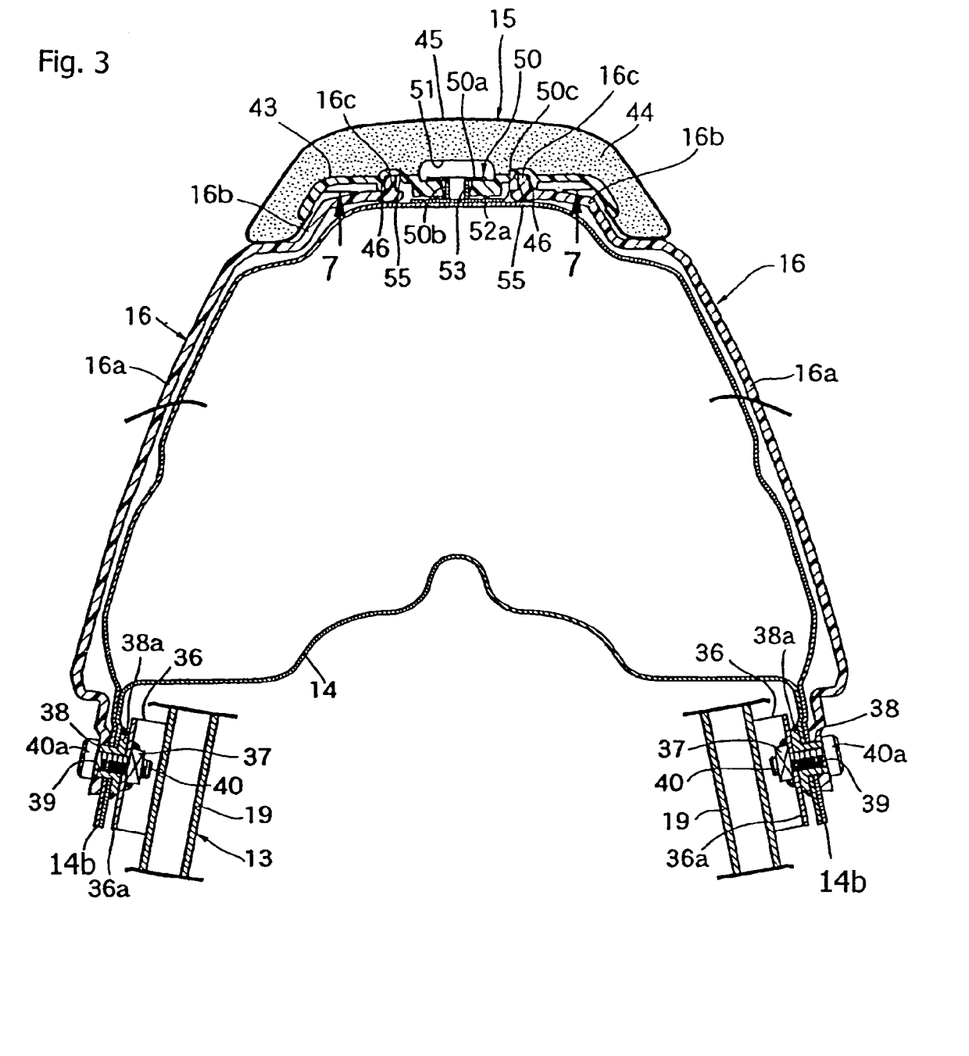
FIG. 3 is a cross-sectional view of the shroud and fuel tank, taken along the line 3-3 in FIG. 2 and showing the distal end of the supporting arm portion of the shroud sandwiched between the rear portion of the fuel tank and the bottom plate of the seat.

FIG. 3 is a cross-sectional view of the shroud 16 and fuel tank 14, taken along the line 3-3 in FIG. 2, and showing a distal end of a supporting arm portion 16b of the shroud sandwiched between the rear portion of the fuel tank 14 and the bottom plate of the seat 15. Referring to FIG. 3, the shroud 16 integrally includes a main shroud portion 16a for covering the side of the fuel tank 14. The shroud 16 is formed of synthetic resin. The shroud 16 also includes a supporting arm portion 16b extending inward along a rear portion of the main shroud portion 16a, so as to be interposed between the front portion of the seat 15 and the rear portion of the fuel tank 14. The shroud 16 also includes an engaging portion 16c projecting upwardly from a distal end of the supporting arm portion 16b, as shown. In the depicted embodiment, the engaging portion 16c is provided in the form of a vertical tab.

The main shroud portion 16a is adapted to be fixed at least to the fuel tank 14. In the depicted embodiment, and as best seen in FIG. 2, an upper middle part of the main shroud portion 16a is secured to the fuel tank 14, and a lower middle part, along with a lower rear part of the main shroud portion 16a, are each respectively secured to the vehicle body frame 13.

Figure 4:
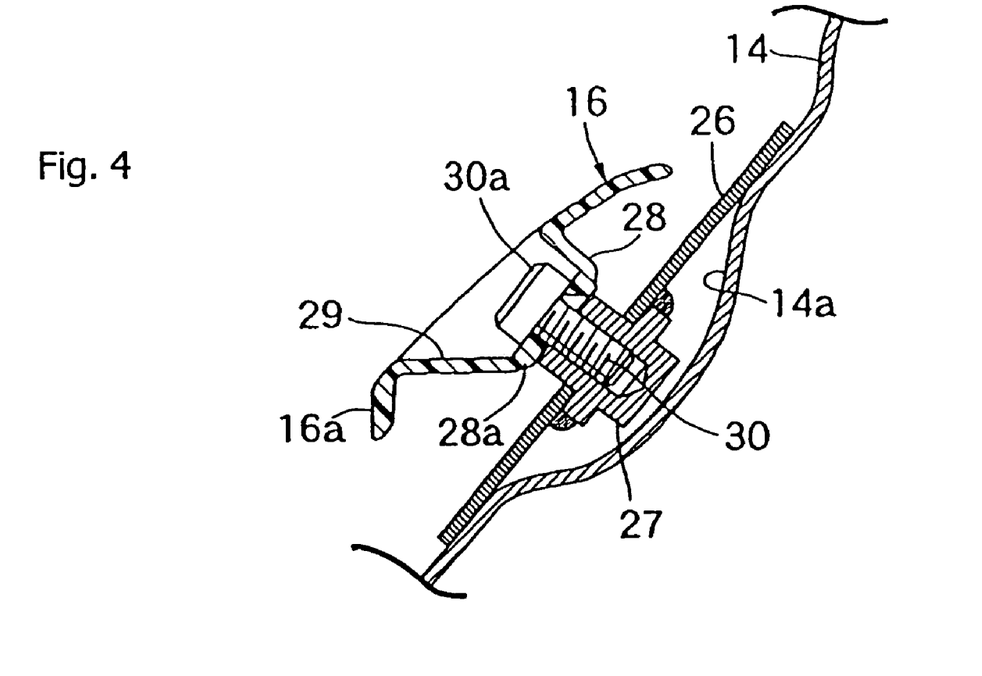
FIG. 4 is a cross-sectional view of an the upper middle portion of the main shroud portion taken along the line 4-4 in FIG. 2, showing the upper middle portion of the shroud fixed to the side of the fuel tank.

FIG. 4 is a cross-sectional view of the upper middle portion of the main shroud portion 16a, taken along the line 4-4 in FIG. 2, and showing the upper middle portion of the main shroud portion affixed to the side of the fuel tank. As seen in FIG. 4, the fuel tank 14 is formed with a recess 14a defined in the wall thereof, which is recessed inwardly on the side surface thereof. A supporting plate 26 is fixed on the outer side surface of the fuel tank 14 by welding or the like, to cover the recess 14a. This support plate 26 has a central hole formed therethrough. A nut member 27 is attached to the supporting plate 16, such that the nut member 27 penetrates through the central hole formed in the supporting plate 26. One end of the nut member 27 is stored in the recess 14a, and is fixed to the supporting plate 26 by welding or the like. In addition, a mounting boss 28 is integrally formed on an upper portion of the shroud 16 to cooperate with the nut member 27 (see also FIG. 2). The mounting boss 28 is formed integrally with the upper middle portion of the main shroud portion 16a of the shroud 16, so as to project therefrom toward the fuel tank 14, while forming an outwardly facing storage recess 29. The mounting boss 28 has an abutment plate portion 28a that comes into abutment with the outer distal end of the nut member 27, and this abutment plate portion is formed with a hole therethrough, as shown. A bolt 30 is inserted through the abutment plate portion 28a of the shroud 16, so that an enlarged diameter head portion 30a of the bolt is accommodated in the storage recess 29, and the bolt is then is screwed into the nut member 27 to effectively fasten the upper middle portion of the main shroud portion 16a to the fuel tank 14.

Figure 5:
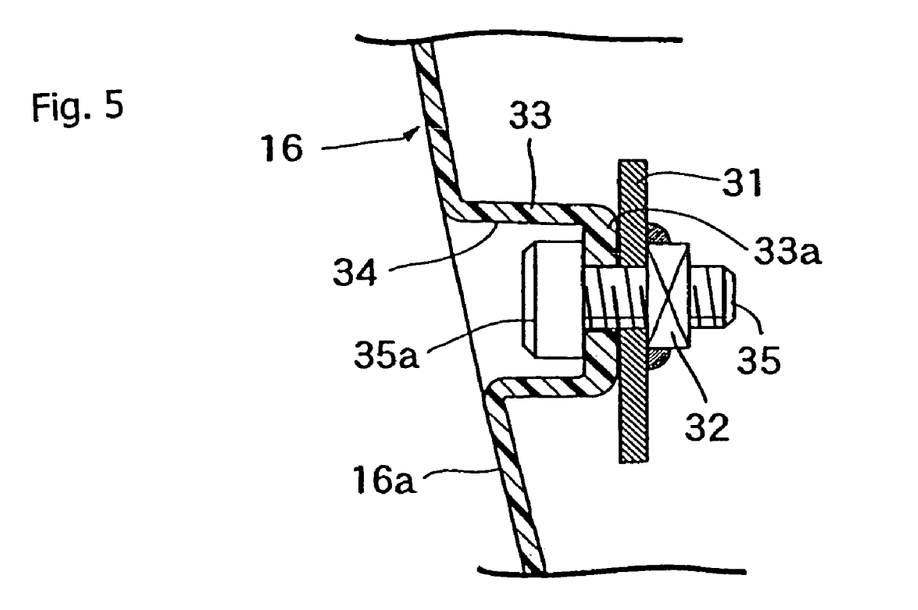
FIG. 5 is a cross-sectional view of a lower middle portion of the main shroud portion taken along the line 5-5 in FIG. 2 showing the lower middle portion of the shroud fixed to a stay, which in turn is fixed to a lower portion of a down tube.

FIG. 5 is a cross-sectional view of a lower middle portion of the main shroud portion 16a, taken along the line 5-5 in FIG. 2, and showing the lower middle portion of the shroud fixed to a stay 31, which is fixed in turn to a lower portion of a down tube 18. Referring to FIG. 5, a stay 31, of a flat plate shape, is opposed to a lower middle part of the main shroud portion 16a of the shroud 16 from the inside. The stay 31 has a hole formed therethrough. The stay 31 is fixed to and extends from the lower portion of the down tube 18 of the vehicle body frame 13 (FIG. 2), and a weld nut 32 is welded on to or otherwise fixed to the inner surface side of the stay 31. In addition, a mounting boss 33 is formed integrally in the shroud 16 on the lower middle portion of the main shroud portion 16a, so as to project toward the stay 31, while forming a storage recess 34 facing outwardly. The mounting boss 33 has an abutment plate portion 33a that comes into abutment with the outer surface of the stay 31 at the distal end thereof. A bolt 35 is inserted through the abutment plate portion 33a so that an enlarged diameter head portion 35a of the bolt is accommodated within the storage recess 34, and is the bolt is screwed into the weld nut 32.

Referring back to FIG. 3, a pair of spaced-apart lower mounting brackets 14b, 14b are respectively provided on opposed lower side portions of the fuel tank 14, as shown. Each of the lower mounting brackets 14b, 14b has a hole formed therethrough. Supporting members 36 are fixed to portions of the center tubes 19 of the vehicle body frame 13, and these supporting members are arranged to be disposed alongside the lower mounting brackets 14b. The supporting members 36 are formed with a substantially U-shape, opening toward the center tubes 19 and having supporting plate portions 36a disposed on the outside of the center tubes 19 at a distance therefrom. Weld nuts 37 are fixed to the inner surfaces of the supporting plate portions 36a, respectively.

Cylindrical collars 38 are provided to be sandwiched between the lower mounting brackets 14b and the supporting plate portions 36a. The cylindrical collars 38 have transverse flanges 38a provided at one end thereof. The other end of each cylindrical collar 38 is inserted through a respective lower mounting bracket 14b on each of the left and right side of the fuel tank 14. Mounting holes 39 are also provided on the lower rear portions of the main shroud portions 16a, and these mounting holes allow passage of the other ends of the cylindrical collars 38. Therefore, bolts 40 are inserted through the cylindrical collars 38, which are inserted into the mounting holes 39 and the supporting plate portions 36a from the side of the other ends of the cylindrical collars 38. The bolts 40 are screwed into the weld nuts 37 so that enlarged-diameter head portions 40a of the bolts 40 are engaged with the other ends of the cylindrical collars 38 and with the outer surfaces of the main shroud portions 16a.

Figure 6:
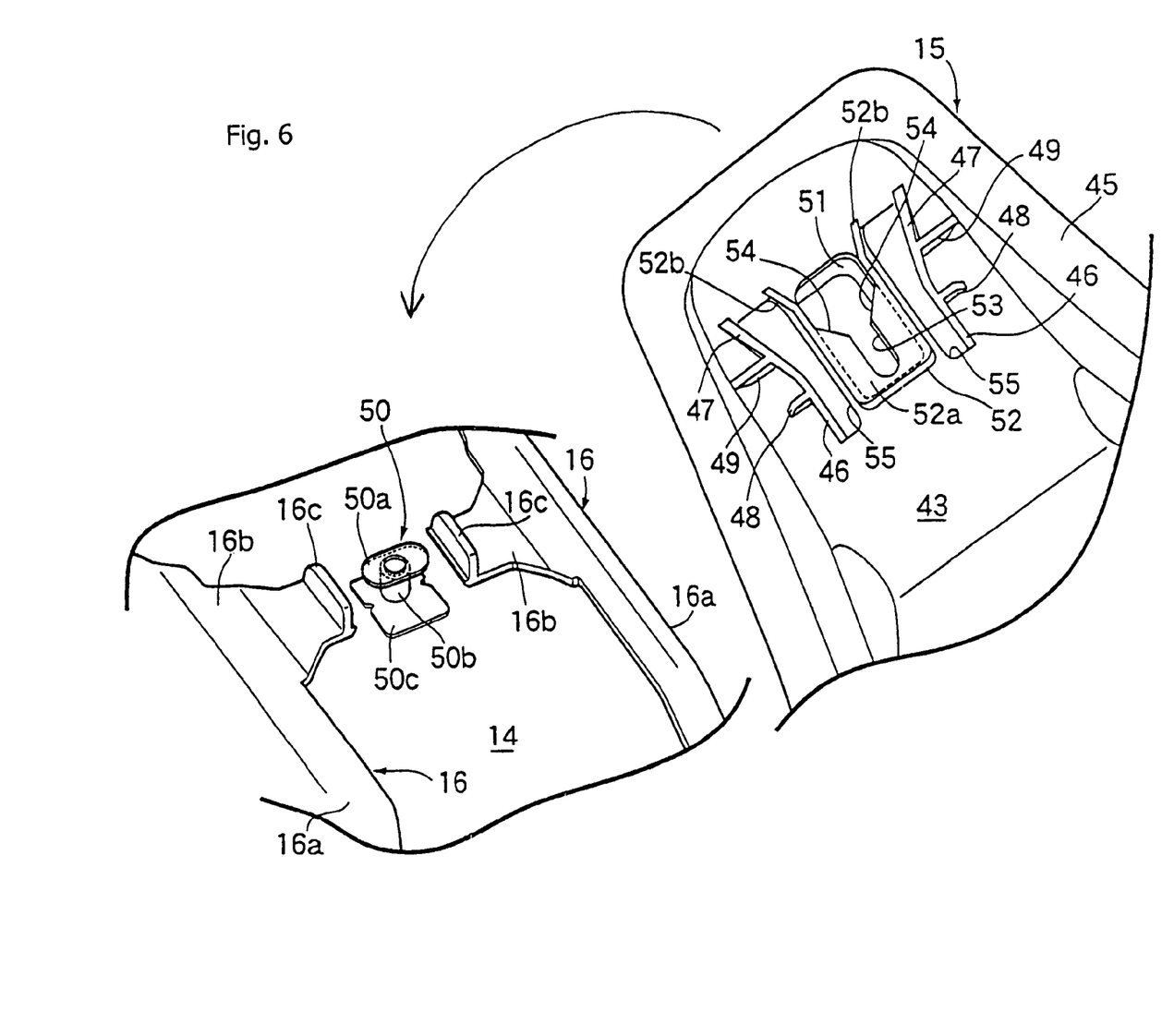
FIG. 6 is perspective view of the interconnecting portions among a seat, a fuel tank and a shroud are shown in a separated state in which the fuel tank and shroud are shown on the left and are viewed from above, and the bottom plate of the seat is shown on the right and viewed from below.

Referring now to FIGS. 3 and 6, the seat 15 includes a bottom plate 43, which may be formed of synthetic resin, and a cushion material 44 is placed on the bottom plate 43 from above. The seat 15 also includes a surface material 45 that is wrapped around the cushion material 44 so that an outer peripheral portion thereof is attached to an outer peripheral portion of the lower surface of the bottom plate 43. The bottom plate 43 of the seat 15 includes a pair of left and right latching portions 46, 46 for allowing removable engagement with the engaging portions 16c of the left and right shrouds 16 on the bottom surface thereof respectively.

As noted, in the depicted embodiment, the engaging portion 16c of the shroud 16 is formed in a tab shape oriented in the fore-and-aft direction of the motorcycle, and this tab-shaped engaging portion 16c extends upwardly from the distal end of the supporting arm portion 16b. The latching portion 46 of the seat 15 projects integrally from the lower surface of the bottom plate 43 in the shape of a projecting ridge extending in the fore-and-aft direction of the motorcycle. The latching portion 46 of the seat 15 engages with the engaging portion 16c of the shroud 16, such that a laterally outward facing surface of the engaging portion 16c interconnects with a laterally inward facing surface of the latching portion 46.

The lower surface of the bottom plate 43 is integrally provided with guide projections 47 formed in a protruding manner extending from an end of the latching portion 46 generally toward the front of the vehicle, while gradually tapering and changing direction toward a lateral outside as they proceed toward the front. The guide projections 47 serve to guide the engaging portions 16c toward the latching portions 46. In addition, reinforcing ribs 48, 49, extending from the outer surfaces of the latching portions 46, the outer surfaces of the guide projections 47 and the lower surface of the bottom plate 43, are formed integrally with the bottom plate 43.

In addition, a further latching mechanism between the seat 15 and the fuel tank 14 will now be described, with continuing reference to FIGS. 3 and 6. The front portion of the bottom plate 43 of the seat 15 is disengageably engaged with an upper surface of a rear portion of the fuel tank 14, in an area between the engaging portions 16c of the pair of left and right shrouds 16. A hook member 50 is fixed to the upper surface of the rear portion of the fuel tank 14 by welding or the like, and is centered between the respective engaging portions 16c, as shown. The hook member 50 includes an engaging plate portion 50a, and a shaft portion 50b whose one end portion is continuous with the center portion of the engaging plate portion 50a to form a substantially T-shape with the engaging plate portion 50a. The hook member 50 also includes a base plate portion 50c of a generally oval shape, which is continuous with the other end of the shaft portion 50b. The base plate portion 50c is fixed to the upper surface of the rear portion of the fuel tank 14 by welding or the like.

In addition, the seat bottom plate 43 and the cushion material 44 of the seat 15 are provided with a recess 51 that is centered between the pair of left and right latching portions 46 and the guide projections 47. A latching frame 52, having a substantially horizontal latching plate portion 52a that covers the rear side of the recess 51, is integrally provided on the bottom plate 43. An engaging slot 53 extends in the fore-and-aft direction of the motorcycle and is provided at a widthwise center of the latching plate portion 52a of the latching frame 52. The engaging slot 53 permits insertion of the shaft portion 50b of the hook member 50 therein, so that the engaging plate portion 50a of the hook member 50 can engage with the back surface of the latching plate portion 52a on both sides of the engaging slot 53. The front end portions of the latching plate portion 52a are formed into tapered guide portions 54, 54. The tapered guide portions 54, 54 are angled to increase the mutual distance, or diverge, toward the front on both sides of the engaging slot 53. This angle permits the guide portions 54, 54 to guide the shaft portion 50a of the hook member 50 smoothly into the engaging slot 53. Front end portions 52b, 52b of the seat bottom plate 43 are angled on both sides of the latching frame 52, to increase the mutual distance (diverge) toward the front in order to guide the latching plate portion 50a of the hook member 50 smoothly toward the recess 51.

Figure 7A:
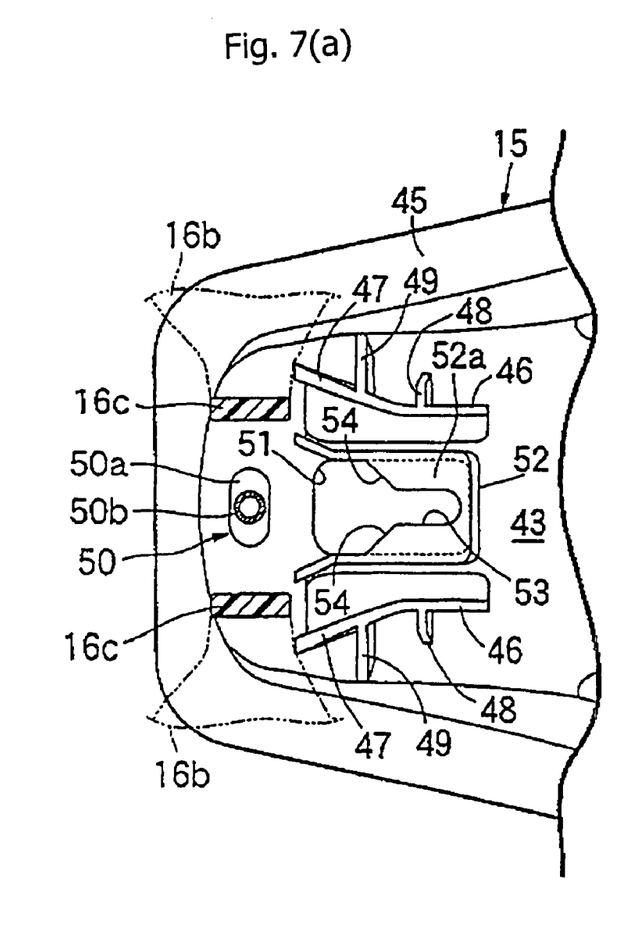
FIG. 7a is a cross-sectional view taken along the line 7-7 in FIG. 3, showing the engaging portions of the shroud adjacent to the guide projections immediately prior to engagement of the engaging portions with the guide projections.

In order to engage the rear portions of both shrouds 16, 16 with the seat 15, and to engage the front portion of the seat 15 with the rear portion of the fuel tank 14, the front portion of the seat 15 is pressed downward and displaced toward the front along the upper surface of the rear portion of the fuel tank 14, from a state in which the engaging portions 16c, 16c of the pair of left and right shrouds 16, 16 are arranged on both sides of the hook member 50 on the rear portion of the fuel tank 14 as shown in FIG. 7(a).

Figure 7B:
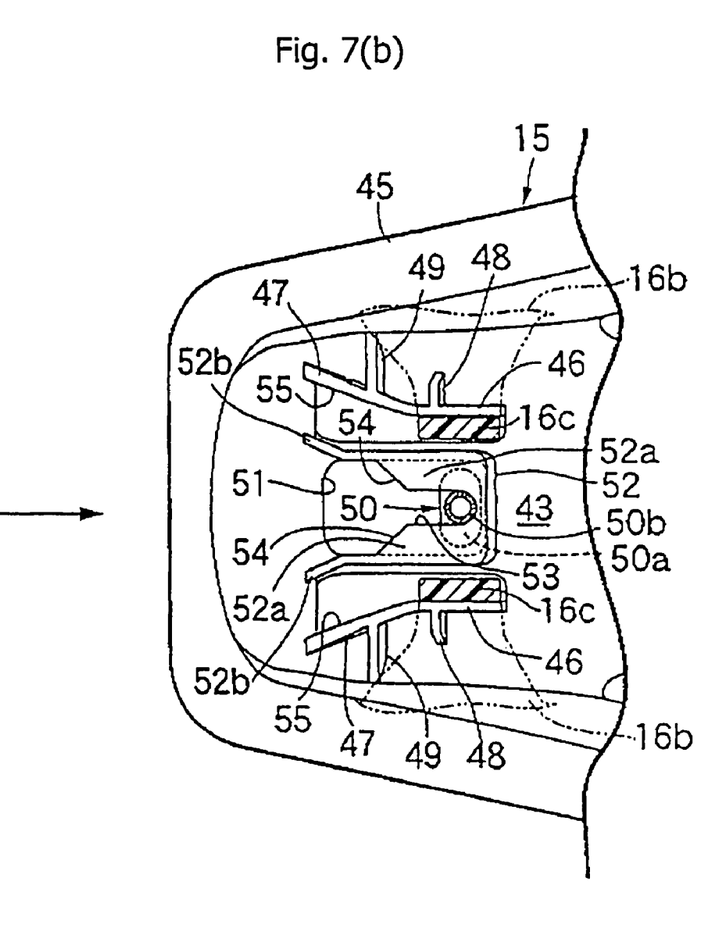
FIG. 7b is a cross-sectional view taken along the line 7-7 in FIG. 3, showing the engaging portions of the shroud in engagement with guide projections.

Then, the supporting arm portions 16b of the both shrouds 16 are sandwiched between the bottom plate 43 of the seat 15 and the fuel tank 14, and as shown in FIG. 7(b), the engaging portions 16c at the distal ends of the supporting arm portions 16b are guided by the guide projections 47 and reach the positions to be engaged with the latching portions 46 along a lateral inside facing surface of the latching portion 46. Meanwhile, the hook member 50, whose shaft portion 50b is to be inserted into the engaging slot 53, reaches a position where the engaging plate portion 50a thereof is engaged with the back surface side of the latching plate portion 52a. Accordingly, the rear portions of the both shrouds 16, 16 can be engaged with the seat 15, and the front portion of the seat 15 can be engaged with the rear portion of the fuel tank 14.

In this case, in order to avoid abutment of the engaging portions 16c of the shrouds 16 with the lower surface of the bottom plate 43 when the seat 15 is pressed downward in order to accommodate the engaging plate portion 50a of the hook member 50 in the recess 51, releasing recesses 55, 55 are provided on the lower surface of the bottom plate 43 between the supporting frame 51 and the latching portions 46 and the guide projections 47 on the both sides thereof.

An operation of this example will now be described. The shroud 16 integrally includes the main shroud portion 16a which covers the side of the fuel tank 14 and is secured at least to the fuel tank 14. The shroud 16 also integrally includes the supporting arm portion 16b extending inward from the rear portion of the main shroud portion 16a and sandwiched between the front portion of the seat 15 and the rear portion of the fuel tank 14, and the engaging portion 16c projecting from the distal end of the supporting arm portion 16b. The shroud 16 is formed of synthetic resin, and the lower surface of the bottom plate 43 of the seat 15, also formed of synthetic resin, is integrally provided with the latching portion 46 for allowing removable engagement with the engaging portion 16c.

In other words, the engaging portion 16c and the latching portion 46 are both formed of synthetic resin, and hence even when the rear portion of the shroud 16 oscillates due to the effect of traveling wind, friction can be reduced both on the engaging portion 16c and the latching portion 46, whereby an occurrence of rattling is avoided for a long term and stable support of the rear portion of the shroud 16 is enabled. In addition, a structure that supports the rear portion of the shroud 16 on the side of the fuel tank 14 is not necessary. Therefore, the number of components and the number of steps in the welding process are reduced, and sufficient capacity of the fuel tank 14 is secured.

The engaging portion 16c is formed into a plate shape elongated in the fore-and-aft direction of the motorcycle and extends upward from the supporting arm portion 16b in a protruding manner, whereby the oscillation of the rear portion of the shroud 16 in the lateral direction of the motorcycle is effectively reduced.

In addition, the latching portion 46, which allows engagement of the engaging portion 16c along a laterally outward facing surface thereof, and extends in the fore-and-aft direction of the motorcycle, and the guide projection 47, formed extending from the front end of the latching portion 46 toward the outside as it proceeds toward the front in order to guide the engaging portion 16c toward the latching portion 46, are integrally formed on the lower surface of the bottom plate 43 of the seat 15 in a protruding manner. Thus, engagement and disengagement of the engaging portion 16c on the side of the shroud 16 with respect to the latching portion 46 of the bottom plate 43 is guided by the guide projection 47 whereby the efficiency of mounting and dismounting work is improved.

Also, by the removable engagement of the front portion of the bottom plate 43 with upper surface of the rear portion of the fuel tank 14 between the engaging portions 16c of the pair of shrouds 16, engagement of the pair of left and right shrouds 16 with the seat 15 is enabled. The front portion of the seat 15, which is overlapped with the rear portion of the fuel tank 14, can be engaged with the upper surface of the rear portion of the fuel tank 14 while effectively utilizing the space between the both engaging portions 16c.

In addition, since the engaging portions of the bottom plate 43 of the seat 15 and the shroud 16 are arranged in the vicinity of the position where the seat 15 and the fuel tank 14 are engaged, the rattling between the bottom plate 43 of the seat 15 and the shroud 16 is further effectively prevented.

Although a selected illustrative embodiment of the present invention has been described thus far, the invention is not limited to the above-described example, and various modifications in design can be made without departing from the claimed invention. The foregoing description is intended to illustrate, rather than to limit the invention. Those skilled in the art will realize that many modifications of the preferred embodiment could be made which would be operable. All such modifications, which are within the scope of the claims, are intended to be within the scope and spirit of the present invention.

What is claimed is:

1. In a motorcycle having a vehicle body frame, a front wheel, a rear wheel, a fuel tank, an engine for driving the rear wheel, and a seat, the vehicle body frame comprising:
   a head pipe; and
   a front fork which is steerably supported by the head pipe and which rotatably supports the front wheel;
   wherein the engine and the fuel tank are respectively mounted on the vehicle body frame,
   the fuel tank is arranged behind the head pipe and above the engine,
   the seat is arranged on a rear side of the fuel tank, with a front portion of the seat overlapping the rear portion of the fuel tank so as to cover the rear portion of the fuel tank from above, the seat comprising a bottom plate;
   the improvement comprising a pair of shrouds formed from a synthetic resin material, and a support structure supporting a rear portion of each shroud on the motorcycle,
   wherein the shrouds have front ends extending toward the front fork and configured to direct traveling wind toward the engine, with one of said shrouds being arranged on each side of the fuel tank to cover at least a part of each side surface of the fuel tank, each shroud integrally comprising:
   a main shroud portion covering the side of the fuel tank, the main shroud portion being secured at least to the fuel tank,
   a supporting arm portion extending inward from a rear portion of the main shroud portion, the supporting arm portion sandwiched between the front portion of the seat and the rear portion of the fuel tank, and
   an engaging portion projecting from an end of the supporting arm portion which is distant from the rear portion of the main shroud portion;
   wherein the support structure comprises a latching portion integrally provided on the bottom plate of the seat, the latching portion being removably engagable with the engaging portion of the shroud; and
   wherein the engaging portion of each shroud is formed in a plate shape elongated in the fore-and-aft direction of the motorcycle, and projects upwardly from the supporting arm portion.

2. The motorcycle shrouds and support structure of claim 1, wherein the latching portion of the support structure extends in the fore and aft direction of the motorcycle and is adapted to engage the engaging portion of the shroud along a laterally outside facing surface of the engaging portion, and wherein the bottom plate of the seat is further integrally provided with a guide projection extending from the front end of the latching portion and curving toward the outside as it extends in the forward direction of the vehicle, the guide projection guiding the engaging portion toward the latching portion during assembly of the seat on the fuel tank.

3. The motorcycle shrouds and support structure of claim 1, wherein a front portion of the bottom plate of the seat is disengageably engaged with the upper surface of the rear portion of the fuel tank between the engaging portions of the pair of shrouds.

4. A motorcycle, comprising a vehicle body frame, a fuel tank, an engine, a seat, at least two fuel tank shrouds, and a shroud supporting structure which supports a rear portion of each shroud on the motorcycle, wherein
   the vehicle body frame comprises a head pipe, and the engine and the fuel tank are mounted on the vehicle body frame such that the fuel tank is arranged behind the head pipe and above the engine,
   wherein the seat is arranged on a rear side of the fuel tank, and a front portion of the seat overlaps the rear portion of the fuel tank to cover the rear portion of the fuel tank from above,
   front ends of the shrouds extend toward the front of the vehicle body frame to direct traveling wind toward the engine, one of said shrouds being arranged on each side of the fuel tank so as to cover at least part of each side surface of the fuel tank,
   wherein each shroud comprises:
   a main shroud portion for covering the side of the fuel tank, the main shroud portion being secured at least to the fuel tank,
   a supporting arm portion extending inward from a rear portion of the main shroud portion, the supporting arm portion interposed between the front portion of the seat and the rear portion of the fuel tank; and
   an engaging portion projecting from an end of the supporting arm portion which is distant from the rear portion of the main shroud portion,
   wherein the shroud supporting structure comprises a latching portion that allows removable engagement with the engaging portion, the latching portion integrally provided on a bottom surface of the seat; and
   wherein the engaging portion of each shroud is formed in a plate shape elongated in the fore-and-aft direction of the motorcycle, and projects upwardly from the supporting arm portion.

5. The motorcycle of claim 4, wherein the seat comprises a bottom plate, the latching portion is integrally provided on a bottom surface of the bottom plate.

6. The motorcycle of claim 4, wherein the seat comprises a bottom plate formed of synthetic resin, and the latching portion is integrally provided on a bottom surface of the bottom plate, and wherein each shroud is formed of synthetic resin.

7. The motorcycle of claim 4, wherein the seat comprises a bottom plate, and the latching portion is integrally provided on a bottom surface of the bottom plate, and wherein the latching portion comprises a pair of laterally spaced projecting ridge members.

8. The motorcycle of claim 7, wherein the seat further comprises a connector for connecting the seat to the fuel tank, and wherein the connector is disposed on the bottom surface of the bottom plate separate from and between the pair of laterally spaced projecting ridge members.

9. The motorcycle of claim 4, wherein the fuel tank comprises a hook member, the hook member formed on an upper surface of the fuel tank, wherein the seat comprises a connector for connecting the seat to the fuel tank, and wherein the connector is disposed on the bottom surface of the seat and is adapted to cooperatively engage the hook member, and wherein the latching portion comprises a pair of laterally spaced projecting ridge members respectively defining side portions of retaining channels which receive and retain respective engaging portions of the shrouds therein, the connector centered between the projecting ridge members.

10. The motorcycle of claim 9, wherein the hook member comprises shaft portion and a plate portion, the shaft portion extending outward from an upper surface of the fuel tank, the plate portion is disposed on an end of the shaft portion so that the shaft portion and plate portion are arranged to form a T-shape when viewed in cross section, and wherein the connector comprises a latching plate disposed substantially in parallel with the bottom surface of the seat, the latching plate including a slot extending in the fore-and-aft direction of the vehicle, the slot is adapted to receive the shaft portion of the hook member therein such that when the connector cooperatively engages the hook member, the plate portion of the hook member resides between the latching plate and the bottom surface of the seat, and the shaft portion resides within the slot, whereby the seat is maintained adjacent to the fuel tank.

11. The motorcycle of claim 4, wherein the latching portion extends in the fore and aft direction of the motorcycle and is adapted to engage the engaging portion such that a laterally outside facing surface of the engaging portion abuts a laterally inside facing surface of the latching portion.

12. The motorcycle of claim 11, wherein support structure further comprises guide projections integrally provided on a bottom surface of the seat, the guide projections forming a projecting wall which extends forward from a front end of the latching portion, and which gradually changes direction to angle toward a lateral side of the vehicle, the guide projections serving to guide the engaging portions of the shroud to the latching portions during assembly of the seat to the fuel tank.

13. The motorcycle of claim 4, wherein a front portion of the bottom surface of the seat is disengagably engaged with the upper surface of the rear portion of the fuel tank between the engaging portions of the pair of shrouds.

14. In a motorcycle having a vehicle body frame, a fuel tank, an engine for driving the rear wheel, a seat, and at least two fuel tank shrouds, wherein the vehicle body frame comprises a head pipe, and the engine and the fuel tank are mounted on the vehicle body frame such that the fuel tank is arranged on a rear side of the head pipe to cover the engine from above, the seat is arranged on a rear side of the fuel tank, and a front portion of the seat overlaps the rear portion of the fuel tank to cover the rear portion of the fuel tank from above, front ends of the fuel tank shrouds extend toward a front of the motorcycle to direct traveling wind toward the engine, a shroud being arranged on each side of the fuel tank so as to cover at least a part of each side surface of the fuel tank, each shroud comprising:

a main shroud portion for covering the side of the fuel tank, the main shroud portion being secured at least to the fuel tank, a supporting arm portion extending inwardly from a rear portion of the main shroud portion, and sandwiched between the front portion of the seat and the rear portion of the fuel tank, an engaging portion projecting upwardly from an inner part of the supporting arm portion, the engaging portion being formed in a plate shape elongated in the fore-and-aft direction of the motorcycle; and wherein a latching portion is formed on a lower surface of the seat, the latching portion adapted to receive the engaging portion of each shroud such that the rear portion of each shroud is operatively connected to the underside of the seat.

15. The motorcycle of claim 14, wherein the seat comprises a bottom plate, and the latching portion is integrally provided on a bottom surface of the bottom plate and defines a pair of retaining channels which respectively receive and retain the respective engaging portions of the shrouds therein.

16. The motorcycle shrouds and support structure of claim 1, wherein the supporting arm portion extends from a vertically intermediate section of the rear portion of the main shroud portion, and tapers inwardly therefrom.

17. The motorcycle shrouds and support structure of claim 4, wherein the supporting arm portion extends from a vertically intermediate section of the rear portion of the main shroud portion, and tapers inwardly therefrom.

* * * * *